W. F. CLARK.
TUBE FEEDER FOR SAWS.
APPLICATION FILED DEC. 4, 1913.

1,121,167.

Patented Dec. 15, 1914.
7 SHEETS—SHEET 1.

Fig. 1.

WITNESSES
R A Balderson
J. B. Blming

INVENTOR
W. F. Clark
by Bakewell Byrnes & Parmelee
his attys

W. F. CLARK.
TUBE FEEDER FOR SAWS.
APPLICATION FILED DEC. 4, 1913.

1,121,167.

Patented Dec. 15, 1914.
7 SHEETS—SHEET 3.

WITNESSES
R A Balderson
J B Bleming

INVENTOR
W. F. Clark
by Bakewell Byrnes & Parmelee
his attys

W. F. CLARK.
TUBE FEEDER FOR SAWS.
APPLICATION FILED DEC. 4, 1913.

1,121,167.

Patented Dec. 15, 1914.
7 SHEETS—SHEET 4.

Fig. 4.

WITNESSES
R. A. Balderson
J. B. Bleming

INVENTOR
W. F. Clark
by Bakewell Byrnes & Parmelee
his attys

W. F. CLARK.
TUBE FEEDER FOR SAWS.
APPLICATION FILED DEC. 4, 1913.

1,121,167.

Patented Dec. 15, 1914.

WITNESSES

INVENTOR
W. F. Clark

W. F. CLARK.
TUBE FEEDER FOR SAWS.
APPLICATION FILED DEC. 4, 1913.

1,121,167.

Patented Dec. 15, 1914.
7 SHEETS—SHEET 6.

WITNESSES
R. A. Balderson
J. B. Fleming

INVENTOR
W. F. Clark
by Bakewell Byrnes Parmelee
his attys

W. F. CLARK.
TUBE FEEDER FOR SAWS.
APPLICATION FILED DEC. 4, 1913.

1,121,167.

Patented Dec. 15, 1914.
7 SHEETS—SHEET 7.

WITNESSES
INVENTOR

UNITED STATES PATENT OFFICE.

WILLIAM F. CLARK, OF CORAOPOLIS, PENNSYLVANIA.

TUBE-FEEDER FOR SAWS.

1,121,167. Specification of Letters Patent. Patented Dec. 15, 1914.

Application filed December 4, 1913. Serial No. 804,566.

*To all whom it may concern:*

Be it known that I, WILLIAM F. CLARK, a citizen of the United States, and a resident of Coraopolis, in the county of Allegheny and State of Pennsylvania, have invented a new and useful Improvement in Tube-Feeders for Saws, of which the following is a full, clear, and exact description, reference being had to the accompanying drawings, forming part of this specification, in which—

This invention relates to a device for cutting tubes to length and squaring the ends thereof, and is designed to provide an efficient device of this character, which will cut the tubes to length without forming a bur around the inside of the tube. I accomplish this by moving the tube bodily toward the cutting saw or saws until the saw has cut through the wall of the tube, and then rotating the tube about its own axis against the action of the saw so that the bur will be carried to the outside by the saw and be continuously cut away as the tube is rotated. This prevents the formation of any bur on the tube at any point after it has been completely severed from the imperfect end.

A further object of my invention is to provide a device of this character which can readily be adjusted to cut tubes of various diameters and in which a saw of small diameter can be used, as it is only necessary to pass the saw through the wall of the tube and thereby greatly reduce the cost of the saws.

Another object of my invention is to provide a device of this character which is provided with a plurality of saws so that I can cut one end with one saw, then move the tube along and cut the other end with the other saw, and thereby eliminate a great deal of time and labor in moving the tube a distance equal to the length thereof.

A further object is to so mount the saws and the manipulators that the saws together with the manipulators can be moved longitudinally with relation to each other to place the saws at a predetermined position with relation to each other to cut tubes of various lengths.

A further object of my invention is to provide a device which will automatically move the pipe or tube into position with relation to the saw or saws, rotate the tube and then permit it to drop out of the machine onto a proper conveyer, if I am cutting tubes to length, or if I am merely squaring one end after the other, to place the tubes on a conveyer so that they can be readily moved along longitudinally in front of the machine for the second cutting operation, and readily removed therefrom after the second cutting operation.

A still further object of my invention is to provide a device in which all of the various parts are driven from a single source of power, and in which the manipulator is automatically stopped after each cut if the machine is being used for squaring one end after the other, or in which the device can be arranged to operate continuously and automatically deliver tubes to the manipulator and permit them to drop from the machine after the ends have been severed, if I am cutting tubes of small diameter to a given length.

The precise nature of my invention will be best understood by reference to the accompanying drawings, which will now be described, it being premised, however, that various changes may be made in the details of construction and general arrangement of the parts without departing from the spirit and scope of my invention, as defined in the appended claims.

Referring to the accompanying drawings, the reference character 2 designates a base which may be continuous or may be made in sections in alinement with each other, and supported on this base is a plurality of frames 3, 3ª and 3ᵇ, and journaled in bearings in these frames are shafts 4, 5 and 6. These shafts are journaled in all of the frames 3, 3ª and 3ᵇ, and the various driving mechanisms in the frames 3ª and 3ᵇ are splined to the shafts so that the frames 3ª and 3ᵇ can readily be moved along the base 2 to adjust the position of the frames with relation to each other in a longitudinal direction so that the device is adaptable to cut tubes of any given length, as hereinafter described.

Slidably mounted on the base plate 2 on the outer sides of the frames 3 and 3ᵇ or connected to these frames 3 and 3ᵇ are the saw-supporting frames 7 and 7ª. These frames are also provided with journals for the main driving shaft 4, which may be connected to a motor or any other suitable source of power, so that it would be continuously driven when the machine is in operation.

As the manipulator frames 3, 3ª and 3ᵇ, as well as the saw frames 7 and 7ª, are duplicates of each other, I will merely describe the operating mechanism at one end of the machine.

Fulcrumed on the shaft 4 is a yoke member 8 which has bearings at its upper end in which is journaled a short shaft 9, to which is secured a saw 10 and a driving pulley 11, which is connected by means of a belt 12 to a driven pulley 13 on the driving shaft 4.

14 designates a yoke which is pivotally connected at its upper end and has a screw 15 adjustably secured to a bracket 16, which may be connected either to the outer side of the frame 3 or to the base 2.

17, 17 are nuts on the screw 15 for securing the yokes 8 and 14 in their proper position so that the saw 10 will merely cut through the wall of the tube when the tube to be cut is brought to its proper position with relation to the parts, as hereinafter described.

Mounted in bearings in the end frame 3 is a transverse shaft 18 which is continuously driven by means of a bevel gear 19, which meshes with the bevel gear 20 on the shaft 4. Mounted on this shaft 18 is a worm 21 which meshes with a worm wheel 22, which is free to rotate on a short longitudinal shaft 23 journaled in bearings in the end frame 3.

24 designates a clutch member which is slidably mounted on the shaft 23, and is arranged to be normally held in engagement with a clutching device 25 on the worm wheel 22 by means of a spring 26. The clutch member 24 is splined to the shaft 23 so that the shaft will be rotated when the clutch members are in engagement with each other. Secured to the inner end of the shaft 23 is a slotted crank 27 and adjustably secured in the slot of this crank member is a crank pin 28 having a roller 29 seated in a slot 30 in a sector 31. This sector 31 is journaled on a spindle 32 connected to the end frame 3, and is always in driving connection with pinions 33 and 34 on the shafts 5 and 6, respectively, so that these shafts are reciprocated to drive the tube manipulators, as hereinafter described. Connected to the shafts 5 and 6 are pinions 35 and 36, respectively. The pinion 35 is in mesh with a rack 37 on the upper manipulator slide 38 which is mounted on guides 39 connected to a rocking frame 40, which is fulcrumed on the shaft 5 and incases the gear wheel 35. The rear end of this rocking frame 40 is connected to the frame 3 by means of a spring-pressed plunger 41 and is arranged to hold the manipulator slide 38 downwardly on the tube to be cut.

Slidably mounted on guides connected to the frame 3 is a reciprocating member 42 which is provided with a rack 43 meshing with the teeth on the pinion 36. Connected to the upper face of the reciprocating member 42 is a filler block 44, and connected to the upper face of this filler block 44 is a gripping plate 45 having a recess 46 at one end thereof. The gear connections for the reciprocating members 38 and 42 are such that they will reciprocate in reverse directions with relation to each other in order to rotate the tube to be cut about a given center, as hereinafter described.

As before stated, the tube is first moved bodily toward the saws and is then rotated about its own axis during the cutting operation. I accomplish this by moving the lower slide member 42 a predetermined distance before the upper slide member 38 is actuated. As the pinions 34 and 36 are directly connected to the shaft 6, the slide member 42 will be moved when the shaft 6 is moved through the medium of the sector 31 and its driving connections. The pinion 33 which meshes with the sector 31 is loosely mounted on the shaft 5, but has extending from one of the openings 47 a pin 48 which extends through a slot 49 in a collar 50 which is keyed to the shaft 5. By this arrangement the lower slide member is moved a predetermined distance in each direction before the upper slide 38 is moved.

As before stated, in one form of my apparatus, I desire to stop the manipulators after each cutting operation, and I accomplish this by means of a stop mechanism connected to the manipulator mechanism in the end frame 3. Connected to the sector 31 by means of bolts is a stop 51 which may be connected in one of a plurality of positions for adjusting the machine for tubes of different diameters. 52 is a shaft journaled in the frame 3 below the shaft 23, and connected to this shaft is a forked lever 53 having pins which engage the clutch member 24 and connected to the other end of the shaft 52 is a lever 54. Pivotally mounted on a pin 55 which is parallel with a shaft 52 is a lever 56, the upper end of which is provided with a roller 57 in the path of the stop projection 51. Pivotally connected to the lever 54 is a link 58, one end of which is provided with an L-shaped slot 59 in which is seated a pin 60 connected to the lever 56.

Figure 4:
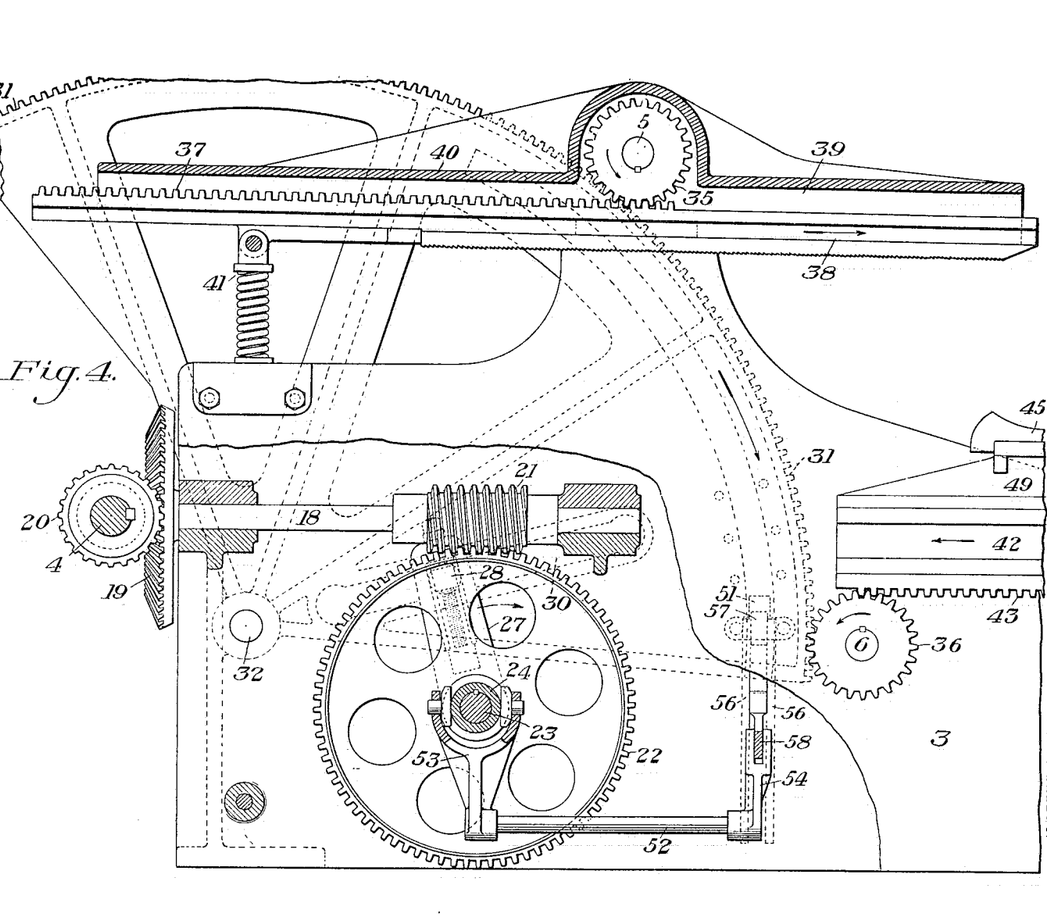
Fig. 4 is a partial tranverse section through the feeding device.
Figure 5:
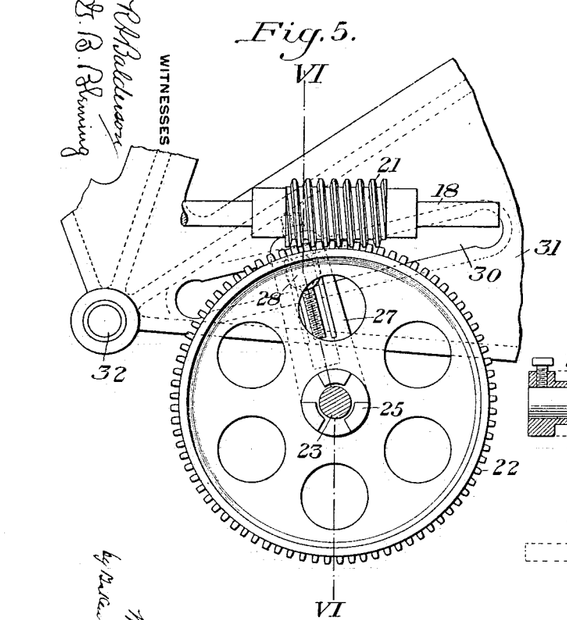
Fig. 5 is a fragmentary end view of the feeding device driving mechanism.

When the manipulator is at rest, the various parts are in the positions shown in the drawings, and when it is desired to put the manipulator into action, the lever 58 is raised to permit the pin 60 to fall into the horizontal portion of the slot 59, and the spring 26 will immediately move the clutch member 24 into engagement with the clutch device 25 on the worm wheel 22, so that the shaft 23 will be rotated, which will in turn rotate the crank 27. As the crank 27 is rotated in the direction indicated by the arrow on Fig. 4, the sector 31 will be moved downwardly to actuate the reciprocating manipulators 38 and 42 in the directions indicated by the arrows on Fig. 4.

Figures 6, 7, 8:
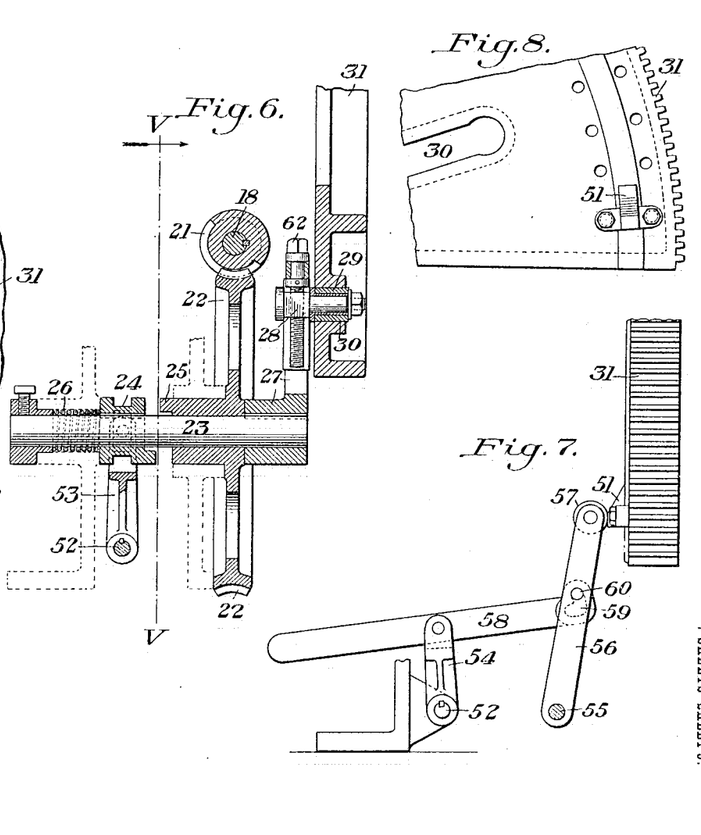
Fig. 6 is a sectional view on the line VI—VI of Fig. 5.
Fig. 7 is a detail front view of a portion of the stop mechanism.
Fig. 8 is a detail side elevation of a portion of the driving sector with the stop lug attached thereto.

Assuming that a piece of tubing has been moved into the recess 46, as indicated at A in Fig. 1, before the mechanism is put into motion, the operation of the device would be as follows:—The slide 42 will move inwardly and carry the tube to the position indicated at B in Fig. 1 before the lost motion between the gear 33 and the collar 50 is taken up, which will move the tube from the position A to the position B against an adjustable stop 61. As soon as the tube reaches this point, the lost motion between the collar and gear will be taken up and the slide 38 will move in the reverse direction from the movement of the slide 42 so that the tube will be rotated about its own center at the position B. During the bodily movement of the tube, the saw will cut through the outer wall thereof, and as the tube is rotated by the reverse movements of the slide members, the end of the tube will be severed from the main body of the tube. The length of the slides is so proportioned that the end of the lower slide 42 will pass under the center of the tube at about the time that the end of the tube has been severed, so that the tube will drop down and back of the slide 42. The mechanism will then be reversed so as to return the parts to the position shown in Fig. 4, and as soon as the stop 51 reaches the position shown in Figs. 4 and 7, the clutch members will be disengaged from each other and permit the various parts of the manipulator to come to a state of rest.

The tube is always maintained under a spring pressure while under the control of the manipulator by means of the spring-pressed plunger 41, which is connected to the rocking frame 40, and the lower face of the slide 38 is roughened in any desirable manner so as to maintain a positive grip on the tube to rotate it about its center during the cutting operation.

If it is desired to adjust the manipulator to handle tubes of a smaller diameter, the stop projection 51 is secured to one of its other positions and the movement of the sector is shortened, which will in turn shorten the movement of the manipulator members 38 and 42. The stroke of the sector is shortened by moving the crank pin 28 toward the shaft 23 by means of an adjusting screw 62, which is rotatably mounted in the end of the crank 27. The pin 48 is also placed in another opening 47 in the gear wheel 33, to give the proper amount of lost motion between the two reciprocating manipulator members, and the filler block 44, together with a plate 45, are removed and a shorter filler block secured in place thereof.

In the drawings, I have shown a device which is adaptable for cutting four different sizes of tubes, although the adjustments may be varied to meet the requirements of various mills.

Figure 1:
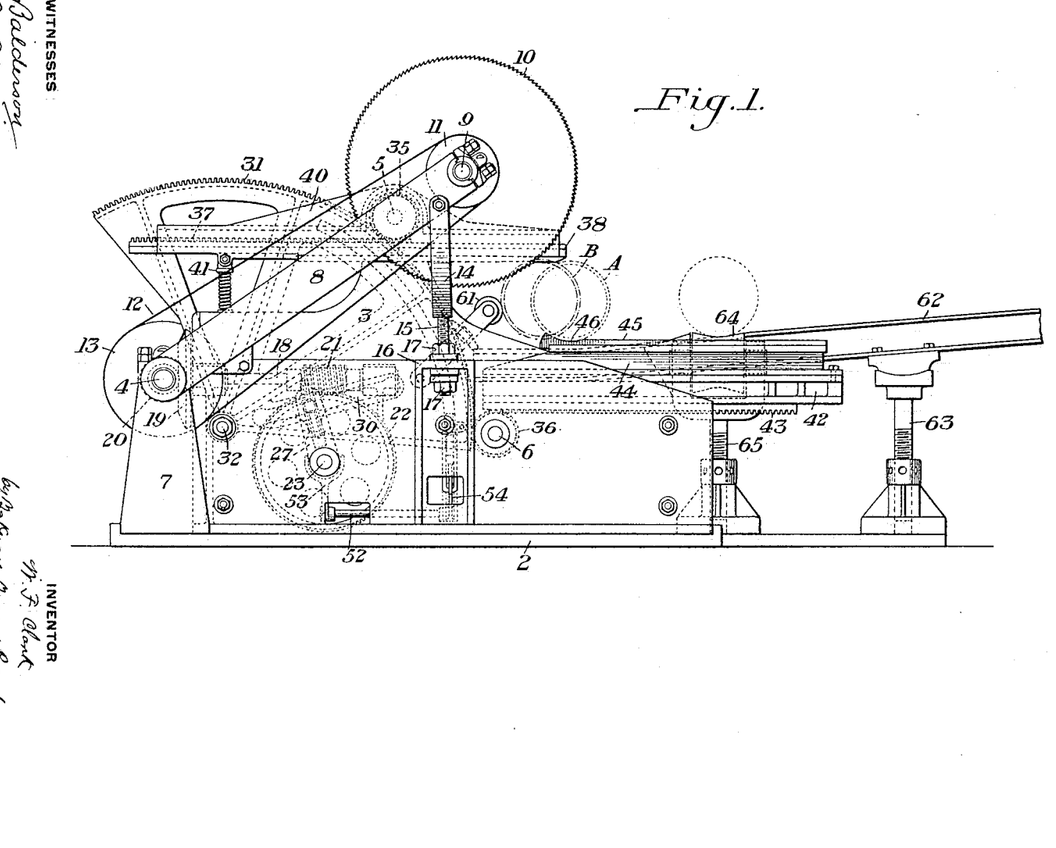
Figure 1 is an end view of one form of my improved tube feeders for saws.
Figure 2:
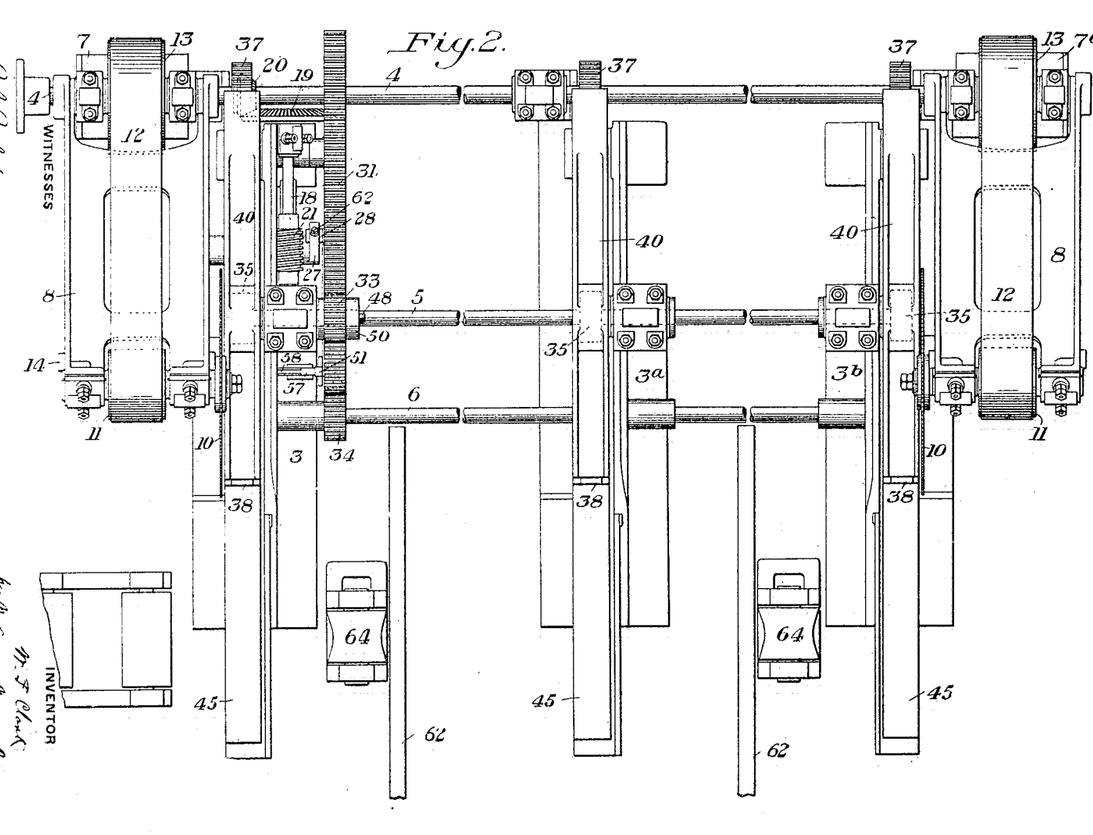
Fig. 2 is a plan view.
Figure 3:
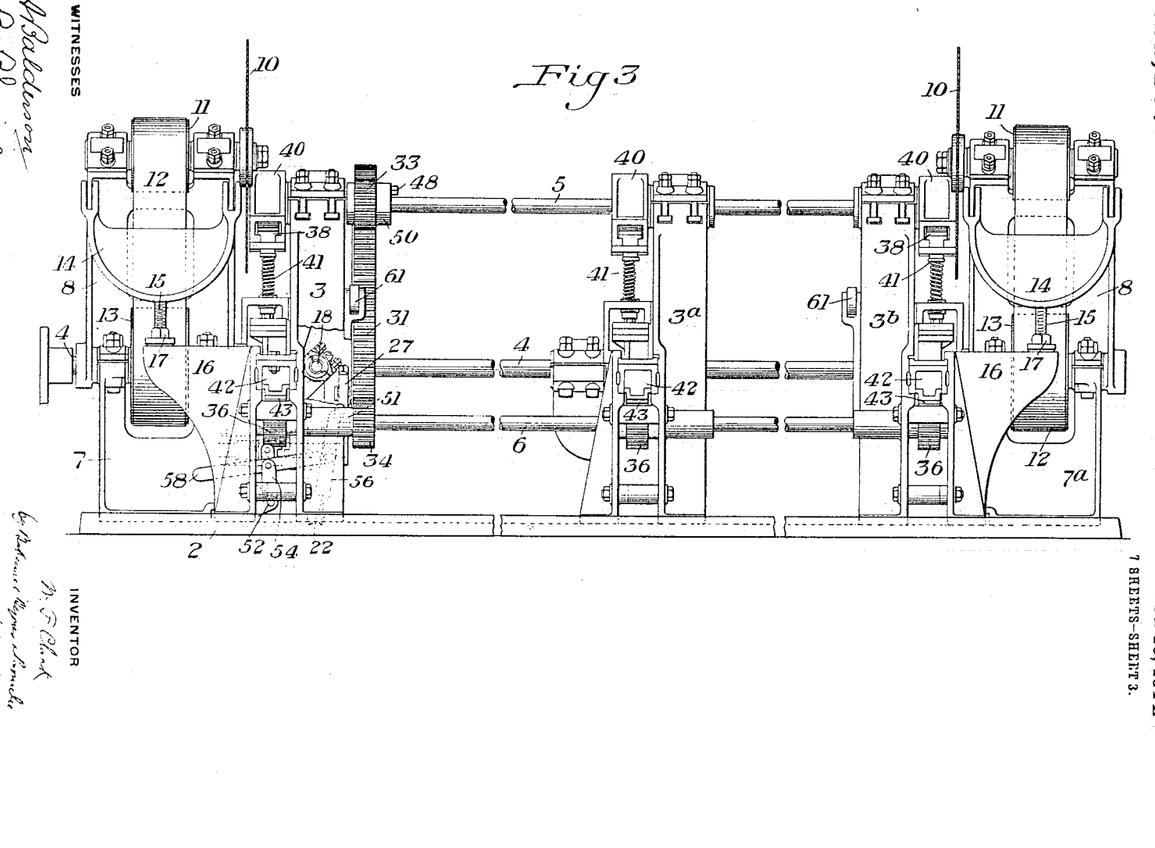
Fig. 3 is a front view.

If it is desired to use the device for cutting one end of a tube with one saw and then move the tube longitudinally and cut off the other end with another saw, I place a runway such as indicated at 62 in Fig. 1, in front of the machine. This runway comprises a plurality of incline skid members which can be adjusted by means of screw jacks 63. The ends of this runway terminate short of the position of the tube when in the saw so that after the tube has been cut, it is moved rearwardly by means of the lower slide 42 onto a plurality of concaved rollers 64, which are adjustably mounted on screw jacks 65 so that the tube can be readily moved longitudinally in front of the manipulator.

Figure 14:
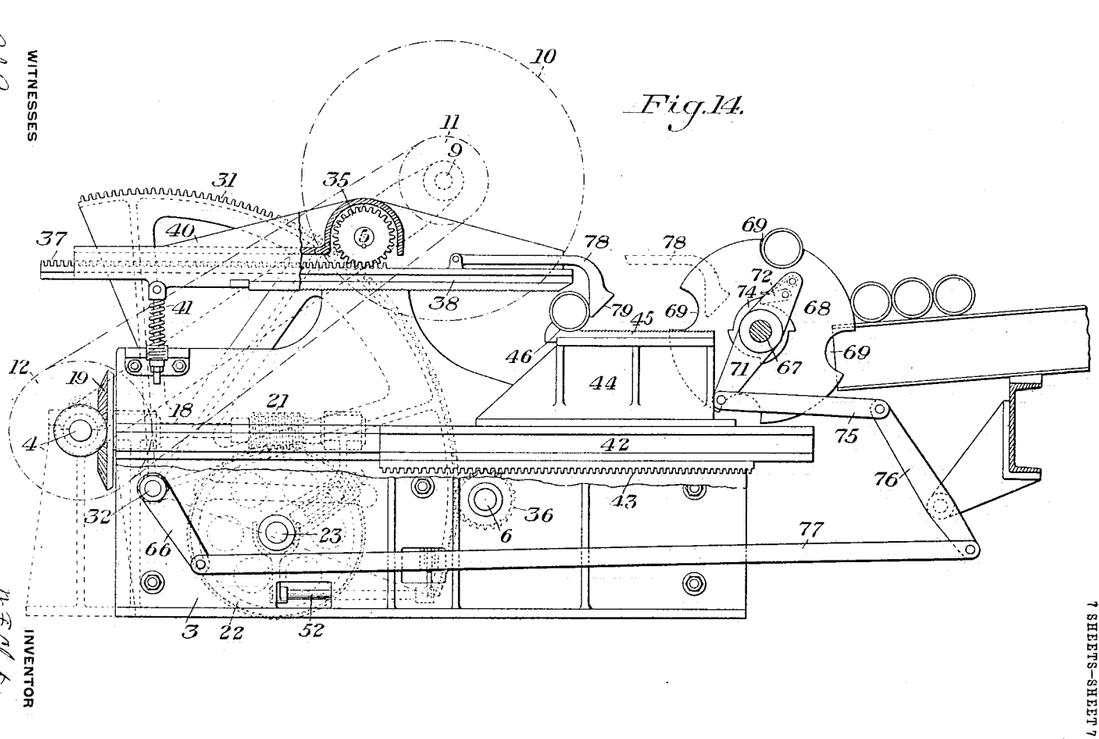
Fig. 14 is an end view of a tube feeder to which I have shown connected an automatic device for delivering the tubes to the feeder.

If it is desired to raise the device so that it will automatically convey the tubes to the manipulator and then permit them to drop to the floor after both ends have been cut off, I connect to the manipulator a feeding device such as shown in Fig. 14, and in which case the saws at both ends simultaneously cut the ends from the tube so that all of the tubes will be cut to a predetermined length.

Figures 9, 10, 11, 12, 13:
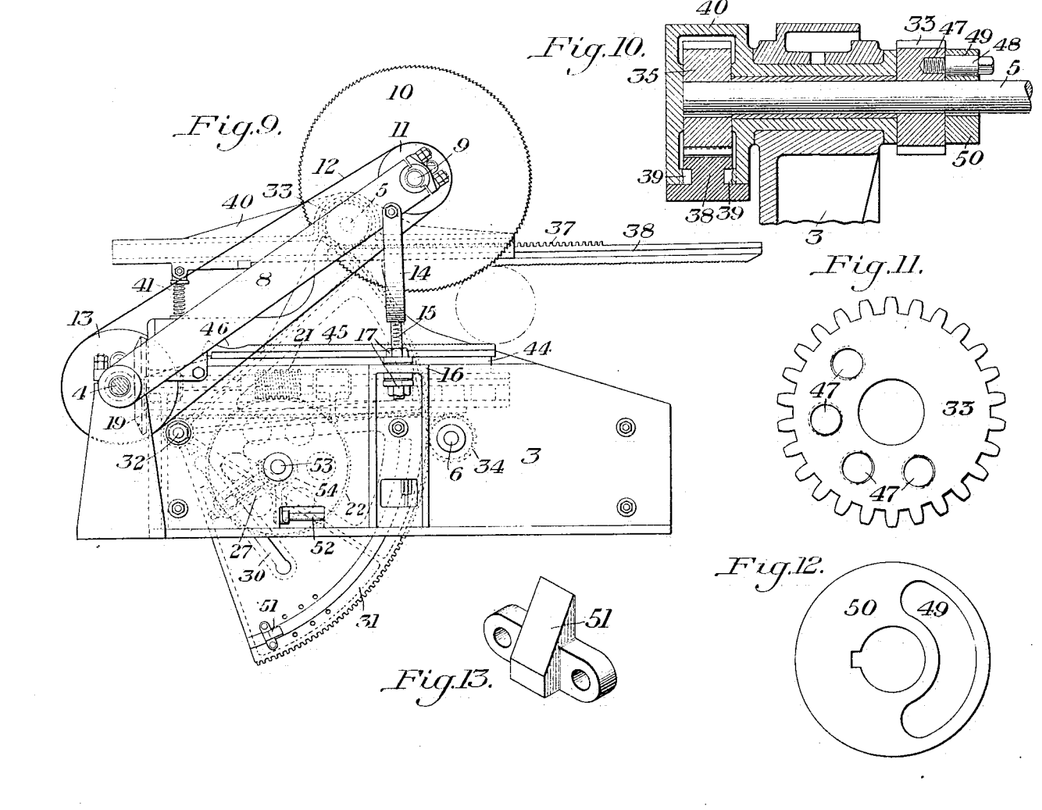
Fig. 9 is an end view similar to Fig. 1 showing the parts in the position they occupy after the tube has been cut.
Fig. 10 is a detail sectional view showing the driving connections at one end of the shaft 5.
Fig. 11 is a side elevation of the manipulator driving pinion.
Fig. 12 is a side elevation of the driving collar.
Fig. 13 is a perspective view of the stop lug.

In a device of this character, the stud shaft 32 is extended beyond the frame of the machine and has connected thereto a crank 66. Journaled in suitable frame work or brackets is a longitudinal shaft 67 to which is connected a plurality of disks 68, which are provided with recesses 69 for conveying the tubes to the manipulator, and loosely mounted on this shaft is a rock arm 71 to which is pivoted a pawl 72 which engages the teeth on the ratchet wheel 74. Connected to this rock arm 71 is a link 75 which is in turn connected to one end of a lever 76 which is connected to the crank 66 by means of a link 77. It will therefore readily be apparent that for each reciprocation of the sector 31, the disks 68 will be moved 90 degrees and feed a pipe to the upper faces of the manipulator slides 44. In order to draw the tube feed to the slides 44 and into the recesses 46 in the slide members 44, I provide each of the upper manipulator slides 38 with a pivoted hook 78, the outer end thereof having a cam member 79. After the ends have been cut from a tube, the various parts will be in the position shown in Fig. 9, and the hook members 78 will be in the position shown in dotted lines in Fig. 14, so that they will extend beyond the tube proper which is fed to the slides 44, and as the mechanism is returned to its initial position after the cutting operation, the tube will be drawn forward from the slides 44 to the position shown in full lines in Fig. 14, so that the tube is ready to be moved forward by the slides 44 on the forward motion of the machine.

The advantages of my invention result from the provision of a manipulator which is arranged to automatically move the tube toward the saw and then to positively hold the tube in proper relation to the saw and rotate it about its own axis against the action of the saw. Further from the provision of means for removing the tube from the machine after it has been cut. Also from the provision of means for bringing the manipulator to a state of rest after the tube has been cut. Further from the provision of means for driving the saws and the manipulator from a single source of power. Further from the provision of means for readily adjusting the machine to cut tubes of various diameters.

This application is a continuation in part of my application Serial No. 767,062, filed May 12, 1913.

I claim:

1. A manipulator for tube-cutting machines, comprising movable feed slides, and means for simultaneously reciprocating said slides in reverse directions; substantially as described.

2. A manipulator for tube-cutting machines, comprising movable feed slides, means for reciprocating said slides in reverse directions, and means for permitting one of said slides to move a predetermined distance before the other slide is moved; substantially as described.

3. A manipulator for tube-cutting machines, comprising movable feed slides, means for simultaneously reciprocating said slides in reverse directions, and means for feeding a tube to the manipulator; substantially as described.

4. A tube-cutting machine, comprising a rotary saw, a manipulator for automatically moving the tube toward the saw and for holding and rotating it about its axis in a predetermined position with relation to the saw; substantially as described.

5. A tube-cutting machine, comprising a rotary saw, a manipulator having upper and lower slides for holding the tube in proper position to be cut by the saw, and means for reciprocating said slides in timed relation to each other to rotate said tube about its axis during the cutting operation; substantially as described.

6. A tube-cutting machine, comprising a rotary saw, a manipulator having upper and lower slides for rotating and holding the tube in proper position with relation to the saw, means for reciprocating said slides in opposite directions to each other, and means for permitting one of said slides to move a predetermined distance in both directions before the other slide is moved; substantially as described.

7. A tube-cutting machine, comprising a rotary saw, a plurality of manipulators having upper and lower slides for moving the tube to be cut into proper position with relation to the saw and to rotate the tube about its own axis, and means for reciprocating said slides in timed relation to each other; substantially as described.

8. A tube-cutting machine, comprising a plurality of rotary saws, a plurality of manipulators each having upper and lower slides for holding the tube in proper position to be cut by the saws, and operating mechanism for moving said slides in opposite directions with relation to each other, said operating mechanism being arranged to move one slide of each set a predetermined distance before the other slide is moved to bring the tube to a predetermined position with relation to the saw, and to then move both slides of each set in opposite directions to each other to rotate the tube about its axis; substantially as described.

9. A tube-cutting machine, comprising a rotary saw, a manipulator having slides for positioning the tube and holding it in proper position to be cut by the saw, and means for reciprocating said slides in opposite directions in timed relation to each other; substantially as described.

10. A tube-cutting machine, comprising a rotary saw, a manipulator having slides for positioning the tube and holding it in proper position to be cut by the saw, and means for reciprocating said slides in opposite directions in timed relation to each other, said means being arranged to permit one of said slides to move a predetermined distance while the other slide is at rest; substantially as described.

11. A manipulator for tube-cutting machines, comprising a plurality of oppositely moving slides, gearing for actuating said slides in reverse directions, and a sector connected to the gearing of both slides; substantially as described.

12. A manipulator for tube-cutting machines, comprising a plurality of oppositely moving slides, gearing for actuating said slides in reverse directions, and a sector connected to the gearing of both slides, there being lost motion between one of the gears actuated by the sector and its slide; substantially as described.

13. A manipulator for tube-cutting machines, comprising a plurality of reciprocating slides, actuating mechanism for reciprocating said slides in reverse directions and in timed relation to each other, a clutch mechanism, a continuously driven actuating mechanism, said clutch mechanism being arranged to connect the slide actuated mechanism with the continuously driven mechanism, and mechanism for disengaging the clutch; substantially as described.

14. A manipulator for tube-cutting machines, comprising movable feed slides, actuating mechanism for reciprocating said slides in reverse direction in timed relation to each other, a source of power, a clutch connection between the source of power and the slide actuating mechanism, and a stop for disengaging said clutch; substantially as described.

15. A manipulator for tube-cutting machines, comprising movable feed slides, means for simultaneously reciprocating said slides in reverse directions, and means for applying pressure to one of said slides to exert pressure on the tube to be actuated by the slides; substantially as described.

16. A tube manipulator of the character described, comprising a plurality of reciprocating slides, guides for said slides, actuating connections between said slides for moving them in proper relation to each other, and means for driving said actuating connections; substantially as described.

17. A manipulator for tube-cutting machines, comprising a plurality of slides for engaging a tube, guides for said slides, means for moving said slides in opposite directions, and a pivoted hook on one of said slides for moving the tube over the other slide; substantially as described.

18. A tube-cutting machine, comprising a rotary saw, a plurality of manipulators having upper and lower slides for moving the tube to be cut into proper position with relation to the saw, and to rotate the tube about its own axis, and means for reciprocating said slides in timed relation to each other; substantially as described.

In testimony whereof, I have hereunto set my hand.

W. F. CLARK.

Witnesses:
JESSE B. HELLER,
H. M. CORWIN.